May 11, 1926.  1,584,433
H. I. CLULEE
INSULATOR FOR HANDLED VESSELS
Filed Oct. 2, 1925
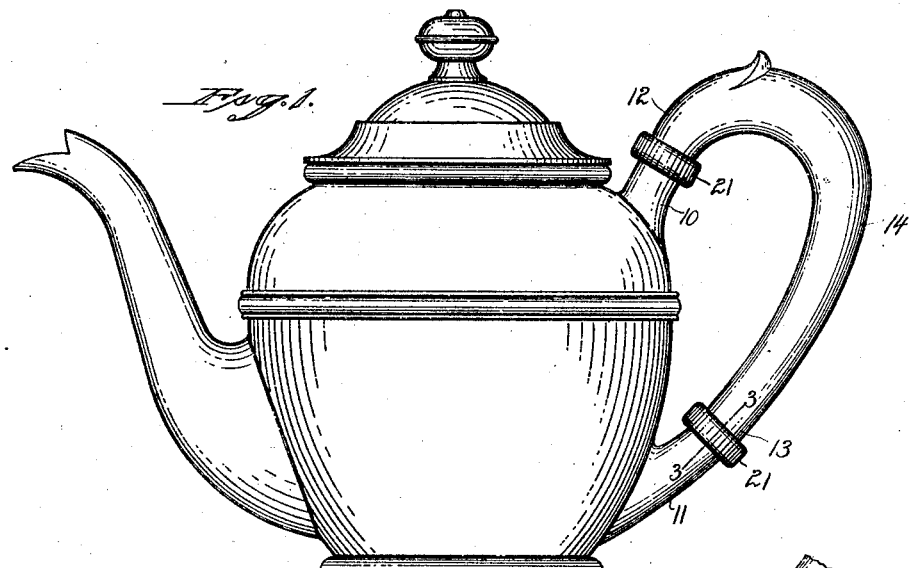
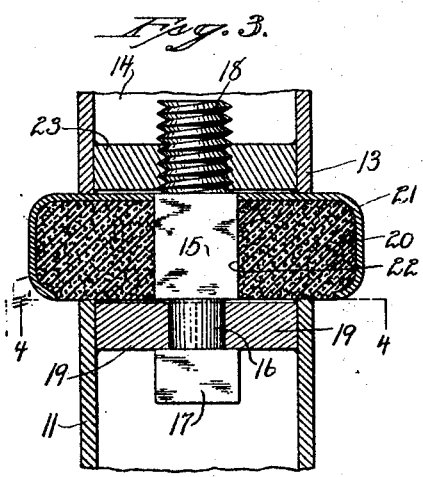
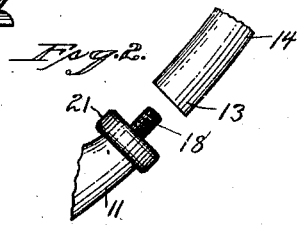
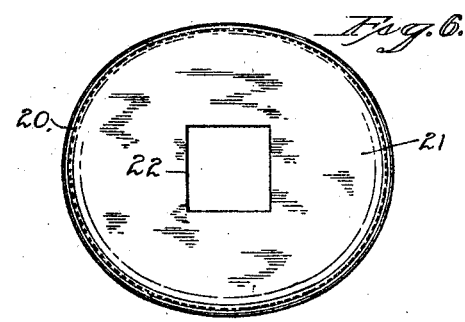
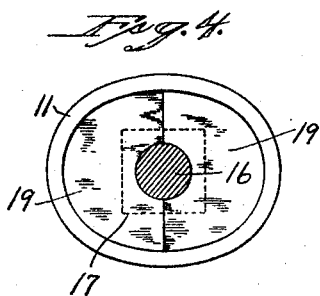

Patented May 11, 1926.

1,584,433

UNITED STATES PATENT OFFICE.

HARRY I. CLULEE, OF WALLINGFORD, CONNECTICUT, ASSIGNOR TO R. WALLACE & SONS MFG. CO., OF WALLINGFORD, CONNECTICUT, A CORPORATION.

INSULATOR FOR HANDLED VESSELS.

Application filed October 2, 1925. Serial No. 59,995.

Fig. 1 is a side view of a vessel provided with insulators constructed in accordance with my invention.

Fig. 2 is a broken, side view with one end of the handle detached.

Fig. 3 is a sectional view on the line 3—3 of Fig. 1, on an enlarged scale.

Fig. 4 is a transverse, sectional view on the line 4—4 of Fig. 3.

Fig. 5 is a side view of one of the connecting-screws, detached.

Fig. 6 is a plan view of one of the insulating members, detached.

This invention relates to an improvement in insulators for handled vessels, such as tea, coffee, and hot water pots. In hotels and restaurants, vessels of this character are subjected to hard usage and to such high temperatures that the solder usually employed in connecting the parts is liable to be melted and the handles loosened, and when so disarranged, the vessels must be returned to the factory for repairs. The object of this invention is to provide an insulator which can be secured between the vessel and the handle by bolts, which insure rigidity and permit the use of hard solder, which is set before the vessel and handles are assembled, this also facilitating the assembling, and the invention consists in the construction as hereinafter described and particularly recited in the claim.

In carrying out my invention, I provide the vessel with the usual handle-sockets 10 and 11, in proper position to align with the ends 12 and 13 of the handle 14. The handle is secured in place by bolts having angular body-portions 15, necks 16, heads 17, and threaded ends 18. On opposite sides of the neck 16 I place anchors 19, which are notched centrally to closely fit the neck and conformed to closely fit into the outer ends of the sockets 10 and 11, in which they are secured by hard silver solder, so that the screws are swiveled in the sockets. The insulators 20 are formed from hard fiber or other suitable material, and preferably set into metal cups 21 in the usual manner. In the center of the insulator is an angular hole 22, corresponding to the body-portion 15 of the screws over which they are set. Into the ends of the handle I insert nuts 23, which may be secured by hard silver solder, and which receive the threaded ends 18 of the screws.

When the ends of the handle are brought into line with the screws, the insulators are turned, first by the fingers and then by suitable wrenches, or pliers, so as to turn the threads of the screws into the nuts and so draw the handle down onto one face of the insulators, which are thereby crowded down onto the ends of the sockets, so as to firmly secure the handles in position and provide insulation between the handle and the vessel.

It is obvious that the screws might be anchored in the ends of the handle, and the nuts mounted in the sockets, as the result will be the same in either case.

By this construction, not only is insulation provided, but the use of soft solder is avoided and, consequently, the vessels will withstand the hard usage and high temperatures to which they are subjected.

If, in course of time, a slight looseness should develop, it can be readily taken up by the user with a suitable tool, and thus avoid the necessity of returning the articles to the factory for repair.

I claim:

The combination with a vessel provided with a socket as one member, of a handle as another member, a screw having a head, an angular body, and a threaded end and neck between the head and body smaller in diameter than either, two centrally-notched anchors fitting the said neck and corresponding in external dimensions with the internal dimensions of either member and secured in one member, a nut secured in the other member, and an insulator engaged with the body of the screw.

In testimony whereof, I have signed this specification.

HARRY I. CLULEE.